3,076,180
MULTIPLE BIT PHASE-MODULATED STORAGE LOOP

Byron L. Havens, Closter, N.J., Paul L. Fleming, Glendale, N.Y., and Kenneth E. Schreiner, Harrington Park, N.J., assignors to International Business Machines Corporation, New York, N.Y., a corporation of New York Filed Oct. 8, 1959, Ser. No. 845,255
22 Claims. (Cl. 340—173)

This invention relates to apparatus for information handling, and more particularly to storage devices for multiple bits of information, as for use in computing and data processing.

An object of the invention is to increase the number of bits that can be stored in a circulatory storage device of given dimensions.

Another object is to increase the time during which information may be stored in the form of circulating pulses before confusion or loss of information occurs.

A further object is to increase the pulse repetition rate at which information can be read into or out of a storage device.

A system is described herein which constitutes a very high speed, non-oscillatory, regenerative type storage device or memory which, among various advantages, is relatively insensitive to the usual causes of confusion and loss.

In the system described herein, a phase notation is employed, by which is meant that a bit of information, e.g., a digit, is represented by the phase of a carrier wave rather than the amplitude of the carrier wave. One particular phase, that of the primary carrier source, is designated the reference phase, to which other phases are compared. In a binary system, for example, the reference phase and one other phase are used to represent the binary digits. In some embodiments, the reference phase is used to represent a binary digit "zero" and a materially different phase, preferably 180 degrees away from the reference phase, is used to represent a binary digit "one". In other embodiments, the digit "one" may be the one represented by the reference phase. In either case, at any point in the system waves representing the digits "one" and "zero" respectively would be 180 degrees out of phase with each other.

In general, as the waves from the carrier source are propagated through the system, the phase of the carrier wave at any given point in the system constitutes "reference phase" at that point. However, where waves from the carrier source are transmitted over a plurality of parallel paths, as will often be the case, it will be necessary to regard one path as the primary path along which the waves are taken as being in the reference phase. Path lengths in the other paths will, in general, need to be adjusted so that when any path rejoins the primary path there will be phase agreement. It will be noted that, at certain points in the system, provision is made for deliberately changing the phase away from reference phase as for example to represent a binary "one." Whenever phase relations at a given point in the system are specified, these relations will be relative to reference phase at the given point.

In information handling systems generally, changes in state will be made at regular intervals, as by means of pulses occurring at a substantially constant repetition frequency, although it will be understood that any two consecutive pulses may either require a change of state or they may indicate that the state of the system is to remain unchanged. While it is not necessary that the system be operated upon a basis of regularly recurring pulses of uniform duration, in many embodiments this condition will be preferred. In many cases, it will be advantageous to employ pulses that are separated by spaces that are as wide as or wider than the pulses. Where the pulses are of very long duration compared to the period of the carrier frequency the carrier wave may be regarded as substantially a continuous wave. Generally, however, an object will be to handle signals at maximum speed, in which case the pulse repetition frequency will be made as high as practicable and the individual pulses will be in the nature of transient disturbances upon the system.

A feature of the system is a non-oscillatory delay loop including a delay line wherein may be accommodated traveling electromagnetic waves which represent a plurality of bits of information and which serve to store the desired information. The waves are preferably of substantially constant frequency and may be either in the form of relatively continuous waves or they may be amplitude-modulated into relatively short pulses. Information is superimposed upon the traveling waves, whether the waves are continuous or in pulses, by phase modulation.

A time interval longer than the period of the carrier frequency will be assigned as a pulse period to be devoted to a single bit of information. In general there will be one pulse per pulse period and the duration of the pulse period determines a pulse repetition rate. The pulse length may be any portion of the pulse period, for example, one half or less of a pulse period. By means of the phase modulation the phase of the carrier wave during the pulse period is determined at a phase value which represents a given bit of information in accordance with the particular phase notation employed.

The time which a pulse takes to traverse the full length of a delay line or of a loop is known as the delay time of the line or loop. The over-all delay time of the loop herein provided is made approximately equal to an integral number of pulse periods. The number of bits of information which can be stored in the loop is the same as this integral number of pulse periods.

The bit capacity of the storage loop may be used to store one or more "words" or groups of bits that make up separate items of information. On the other hand, the loop may be used to store a single word made up of a number of bits equal to the full capacity of the loop. In an embodiment that has been built and successfully operated the storage loop has a capacity of 16 bits, with an over-all delay time of approximately 32 millimicro seconds.

In any system operating on regularly recurring pulses, the spacing of the pulses may be timed by means of a train of pulses, known as "clock pulses" which occur at the required pulse rate. The frequency corresponding to the repetition rate of the clock pulses will be called the "clock frequency." In the above example, the clock frequency is 500 megacycles. The beginning of a word may be controlled by means of a "word pulse" and in the usual case, where the words are of uniform length in number of bits per word, the word pulse repetition rate will be called the "word frequency." In the above example, the word frequency is 31.25 megacycles.

Clock pulses may comprise either portions of sine waves of clock frequency or they may be carrier waves amplitude-modulated into pulses recurring at the clock frequency. A word pulse may comprise a part of a cycle of a sine wave of clock frequency and recurring at the word frequency or it may comprise a few cycles of carrier frequency, amplitude-modulated at the clock frequency to form a pulse which recurs at the word frequency.

The delay loop is provided with amplifying means to offset transmission losses, together with means for adjusting the effective length of the loop, and unidirectional transmission means to restrict the transmission to waves traveling in a single direction.

The line is connected at the input end to a modulator, sometimes called the re-modulator, and at the output end to a detector, sometimes called the demodulator. The detector translates received pulses into unidirectional current pulses which are passed to the re-modulator through a filter to control the release of a reshaped and retimed pulse which passes into the line. The delay line together with the demodulator and re-modulator forms the loop which permits pulses to circulate continually around through the delay line. The loop, however, although closed, is of a non-oscillatory nature, in the sense that, having a high threshold value of amplification, small disturbances will not build up into sustained oscillations.

The loop is provided with means for reading in a train of pulses into storage in the loop and means for reading out the values of pulses circulating in the loop.

The demodulator receives an input wave from the delay line and compares the phase of this input wave with a carrier wave of reference phase. The output of the demodulator, in the case of an input pulse, is a unidirectional current pulse which carries the phase information as represented by the polarity of the pulse, but which is not a replica of the phase modulated input wave. The re-modulator responds to a unidirectional current pulse to impress upon the delay line at a predetermined instant of time a new phase-modulated carrier pulse of suitable amplitude, the phase of which either conforms to the reference phase or is 180 degrees out of phase with the reference, in accordance with the information carried by the unidirectional current pulse.

The combination of the demodulator and the re-modulator forms a regenerative repeater for phase-modulated carrier pulses which has the property of reshaping the carrier frequency wave form of a pulse with especial reference to restoring the carrier phase of the pulse to an original correct value controlled by the reference phase of the carrier source. This combination is able to respond to each pulse impressed upon it successively from the output end of the delay line to produce a phase and amplitude corrected pulse which it impresses upon the input end of the delay line. The new pulses form a train of pulses that is propagated along the line. Each individual pulse is regenerated upon reaching the demodulator and is in effect put back into the line. There is no necessary relationship between the phase of one pulse and the phase of another pulse in the train. Accordingly, any number of independent bits of information may be stored by means of phase-modulated pulses in the storage loop up to the full number of pulse intervals contained in the loop.

A change of information may be read into the loop by overriding any existing pulse with a pulse of unlike phase. In formation may be read out by comparing the phase of a pulse in the train with the reference phase.

It is particularly advantageous to employ as a carrier wave one having a frequency of a kilomegacycle per second or higher, such waves being commonly called "microwaves." At such frequencies, delay lines long enough to accommodate a plurality of bits are of reasonable physical lengths. Also, very wide frequency bandwidths such as are necessary for high speed signalling are available at these frequencies. In the example cited above, the carrier frequency is 9.01 kilomegacycles.

A feature of the system is a reshaping of the wave in the demodulator re-modulator combination with particular reference to the carrier frequency phase of the wave, to restore the phase to the reference phase condition or to a phase condition having a predetermined relationship to the reference phase condition. This is accomplished by combining in the demodulator a wave received from the delay line with a carrier wave of reference phase to obtain a unidirectional current pulse which in turn is used in the re-modulator to control the introduction into the line of a new wave of the required phase.

Another feature of the system is a retiming of the wave in the demodulator re-modulator combination to synchronize the envelope of the new wave with the clock frequency.

In order to maintain substantially fixed carrier phase relationships where needed in the system, it is important that the total time delay around the entire loop including the delay line and the demodulator re-modulator combination be an exact integral multiple of a half period of the carrier frequency, with a maximum tolerance well under plus or minus a quarter cycle at the carrier frequency.

The system employs amplitude expansion and compression techniques to obtain amplitude discrimination between wanted and unwanted pulses present in the loop, with the result that the signal to noise ratio is improved. The system also employs phase discrimination to discriminate against pulses which may appear with a phase modulation which is neither in phase nor 180 degrees out of phase with the reference. For brevity, such undesired phases may be said to be not "collinear" with the reference phase, since in a vector diagram these undesired phases would appear as vectors that are not parallel to a vector representing the reference phase.

It will be noted that in a circulatory storage system, if there is a significant amount of dispersion present (i.e., variation of speed of propagation wtih frequency) in the storage loop, a pulse circuiting in the loop and occupying, as it does, a band of frequencies rather than a single frequency, will continually spread out as it circulates, thereby occupying a greater and greater length of path in the loop. The lengthened pulse will consequently also require a longer read-out time than the original pulse. After a sufficient number of round trips the result of the dispersion will be that successive pulses will become overlapping. There is thus a limit placed by the dispersion upon the maximum time during which signals can be stored in a given length of loop without confusion of pulses. In a broken loop as used herein with regenerative reshaping and retiming of the pulses, the limitation on the time of storage is reduced. As a result, the usable length of loop and consequently the number of bits of information that can be stored is increased.

A feature of the regenerative repeater disclosed herein is a combination of a constant current biasing source for diodes in the re-modulator and a coupling circuit between a demodulator diode and a re-modulator diode which renders the repeater insensitive to amplitude changes which occur more slowly than the pulse repetition rate, while enabling the repeater to respond to transient changes such as occur within the duration of a pulse.

The system as a whole constitutes from one standpoint a microwave, multiple bit, circulatory, non-oscillatory storage device using phase notation.

Other objects, features and advantages will appear from the following more detailed description of illustrative embodiments of the invention, which will now be given in conjunction with the accompanying drawings.

Figure 1:
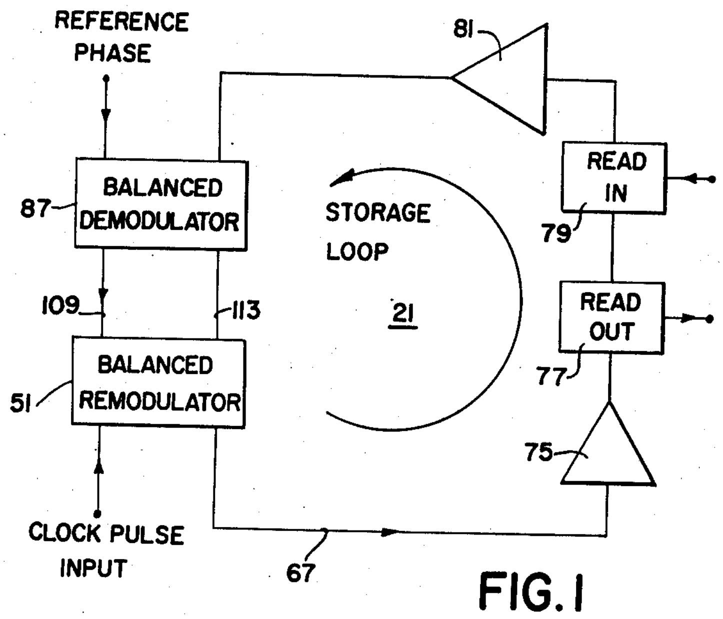
FIGS. 1 and 2 are simplified schematic block diagrams of illustrative embodiments of the invention.
Figure 2:
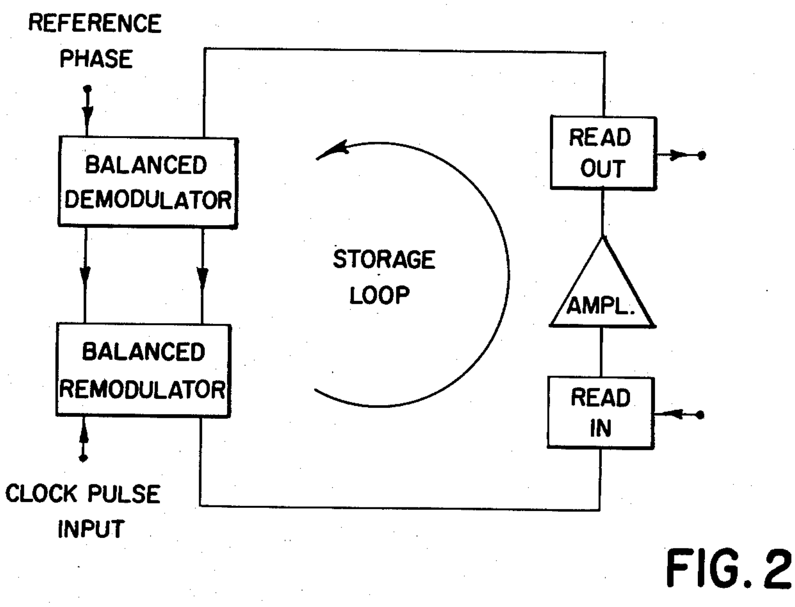

The general scheme of one form of a storage loop in accordance with the invention is shown in single-line diagram in FIG. 1. Another form of storage loop is shown in FIG. 2.

In FIG. 1, the loop 21 comprises a balanced remodulator 51, a transmission line 67 which in turn includes a low power traveling wave tube amplifier 75, a read-out device 77, a read-in device 79 and a high power traveling wave tube amplifier 81, together with a balanced demodulator 87. Lines 109 and 113 connect the demodulator 87 to the remodulator 51. In one satisfactory embodiment, the device 75 may be an X-band traveling wave tube amplifier of 5 milliwatts minimum power, and the device 81 may be an X-band traveling wave tube amplifier of 100 milliwatts minimum power. Such traveling wave tube devices are commercially available, for example, from Alfred Electronics, Palo Alto, California, under their designations Model No. 515–A and Model No. 510, respectively. Suitable traveling wave tube amplifiers have been described, for example, in Traveling-Wave Tubes, particularly Chapter 2, by J. R. Pierce, published by D. Van Nostrand Co., Inc., 1950.

The loop, strictly speaking, is broken, with the combination of the demodulator 87 and the remodulator 51 spanning the break in the loop. This combination may equally well be designated a detector-modulator, its function being to intercept a pulse circulating in the loop, detect or demodulate it and to produce a substantially new, retimed and reshaped pulse, by a process of modulation or re-modulation, the new pulse being delivered to the loop on the opposite side of the break from the point where the pulse was intercepted. The process of renewing the pulse may be termed regeneration.

In the operation of the system of FIG. 1, a clock pulse input is impressed upon the remodulator 51, along with detected signals from the demodulator 87 to produce in the re-modulator phase-modulated pulses of a particular phase determined by the phase relation between the reference phase and the phase of the pulses received in the demodulator from the loop 21. The pulses from the remodulator constitute regenerated pulses which are fed into the line 67 and are propagated in a counterclockwise direction around the loop 21. The pulses are amplified in the traveling wave tube amplifier 75. Under suitable conditions, the pulses may be read out as they pass through the read-out device 77. The read-out process is preferably a non-destructive one, so that the pulses continue to circulate beyond the read-out device. In the read-in device 79 the pulses may either be passed along without change or under suitable conditions new information may be read in to take the place of old information carried by the pulses. The reading-in process consists in changing the phase modulation of each pulse as it passes through the read-in device whenever necessary to make the phase modulation of each pulse conform to the respective item of the new information which it is required to represent. The pulses, new or old as the case may be, are amplified in the traveling wave tube amplifier 81 and impressed upon the demodulator 87. In the demodulator, the pulses are detected and the detected currents are passed over the connections 109 and 113 to the re-modulator 51 wherein retimed and reshaped pulses are formed and impressed upon the line 67.

The arrangement shown in FIG. 2 differs from that shown in FIG. 1 in that in the system of FIG. 2 a single amplifier is employed which is placed between the read-in device and the read-out device, and the read-in and read-out devices are so arranged that a circulating wave in the storage loop encounters first the read-in device and then the read-out device.

Figure 3:
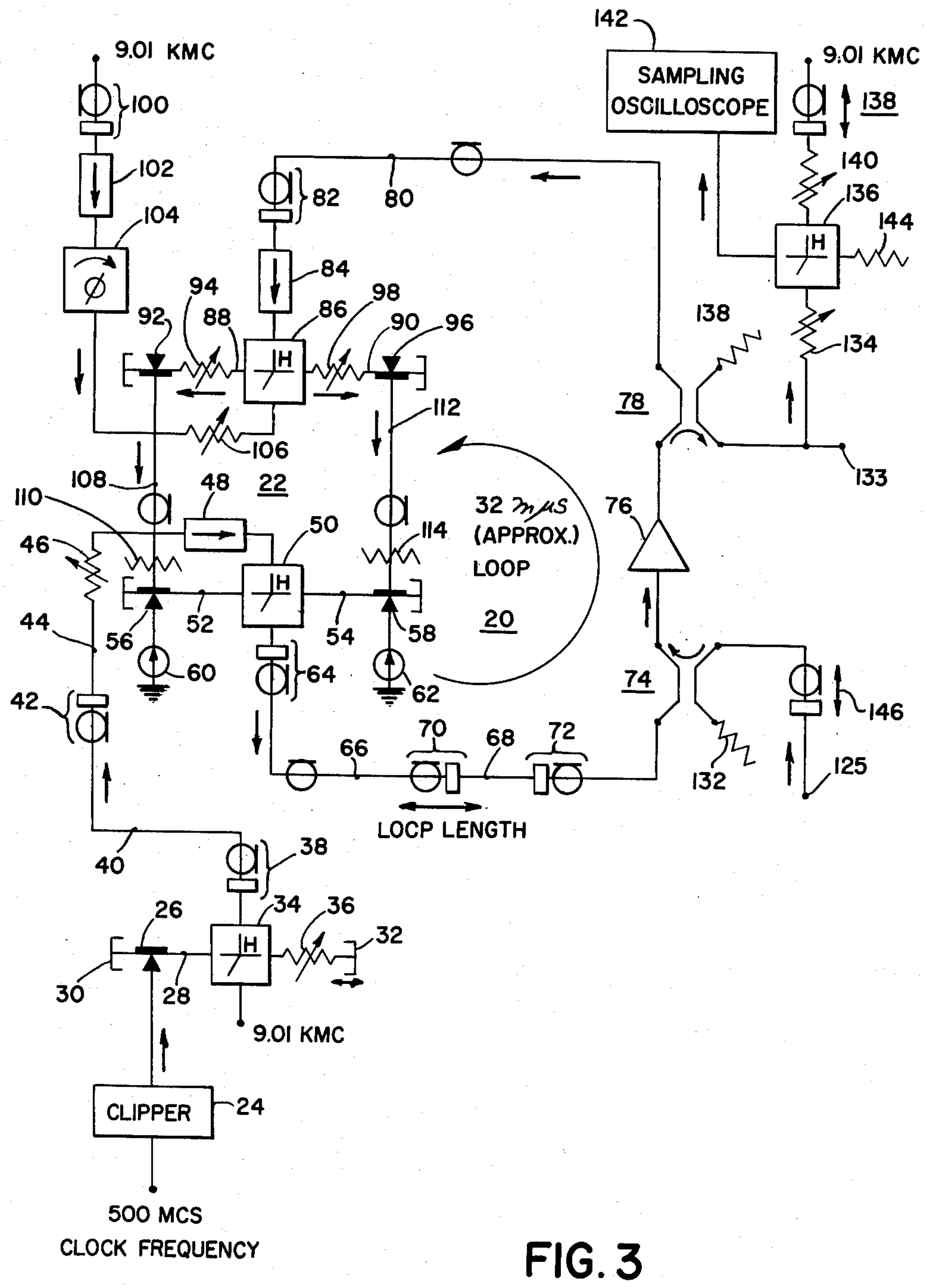
FIG. 3 is a more detailed schematic diagram of the embodiment shown in FIG. 2.

The system of FIG. 2 will now be described with reference to the more detailed schematic diagram thereof as shown in FIG. 3 and with reference to illustrative wave forms shown in FIG. 6.

Although the systems of FIGS. 1 and 2 differ in arrangement as described above, similar components may be employed, and the description below of the detailed version (FIG. 3) of the system of FIG. 2 will also serve to make clear the details of the components to be employed in the arrangement of FIG. 1.

In an embodiment which has been successfully operated, a carrier frequency of 9.01 kilomegacycles per second is used, together with a pulse repetition or clock frequency of 500 megacycles per second, that is, a pulse every two millimicroseconds. It will be understood that the invention is not limited to these frequencies. The carrier frequency may have any suitable value, preferably in the kilomegacycle range or higher and may be supplied by any suitable source, for example, a klystron oscillator, which may be frequency stabilized as by any known method of automatic frequency control. To permit a clearer showing in FIG. 6 a carrier frequency of 3 kilomegacycles is represented in curve F of that figure, with a clock frequency of 500 megacycles represented in curve G. The pulse frequency may be generated in any suitable manner, as, for example, by frequency multiplication of the output of an oscillator of lower frequency. In one embodiment, a base frequency oscillator operating at 5.208⅓ megacycles is used to obtain a harmonic frequency at 31.25 megacycles, which frequency in turn is used to obtain other harmonic frequencies at 62.5, 125, 250 and 500 megacycles. In the same embodiment, a wave of the eighteenth harmonic of 500 megacycles, namely 9.0 kilomegacycles, may be combined with a wave of 9.01 kilomegacycles to obtain a beat frequency of 10 megacycles which is impressed upon a frequency discriminator which in turn automatically adjusts the frequency of the klystron.

To provide a source of amplitude-modulated pulses of carrier frequency in the storage loop 20, a 500 mc. substantially sinusoidal alternating wave is impressed upon a clipper circuit 24 which passes only the negative tips of the wave, providing modulating pulses each of a duration of a millimicrosecond or less and occurring at a pulse repetition rate of one pulse every two millimicroseconds. A train of such pulses is represented in curve H of FIG. 6. A form of clipper circuit suitable for use herein is shown in detail in FIG. 14. The train of pulses from the clipper 24 is impressed upon a diode 26 contained in a waveguide 28 having short-circuited ends 30 and 32.

A number of magic-T's are employed in the system. These are hybrid tee junctions which in the waveguide form have two side arms in alignment. The waveguide is assumed to be of rectangular cross section. The H-arm extends out of the narrower side wall of the waveguide and has the property that when a wave enters the junction through the H-arm the wave divides to form two waves going out through the respective side arms in like phase. Also, when two waves of like phase approach the junction from the opposite side arms, they combine to form a wave of substantially double amplitude in the H-arm.

The E-arm of the magic-T extends out from the wider wall or top wall, of the waveguide. When a wave enters the junction through the E-arm the wave divides to form two waves of opposite phases going out through the respective side arms. When two waves of like phase approach the junction from the opposite side arms, they enter the E-arm in opposing phases so as to tend to annul each other in the E-arm. The same two waves enter the H-arm in like phases so as to tend to double the amplitude in the resultant wave. When two waves of opposing phase approach the junction from the opposite side arms, they tend to annul each other in the H-arm and to reinforce each other in the E-arm.

In the drawings, the magic-T's are shown symbolically, the position of the H-arm being indicated by "H" on the symbolic showing. The side arms are indicated by horizontal lines and the arm opposite the H-arm is the E-arm.

Figure 11:
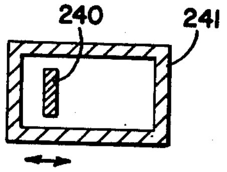

The diode 26 serves as a wave reflecting device. In the quiescent state the reflection from diode 26 is canceled in the output arm of a magic-T 34 by means of a reflection from the opposite side arm. For this purpose, a variable reflection is obtained through the use of a variable (adjustable) attenuator 36 and the variable short circuit at 32. A variable attenuator of a type suitable for use here and elsewhere in the system of FIG. 3 is shown in FIG. 11.

Figure 6:
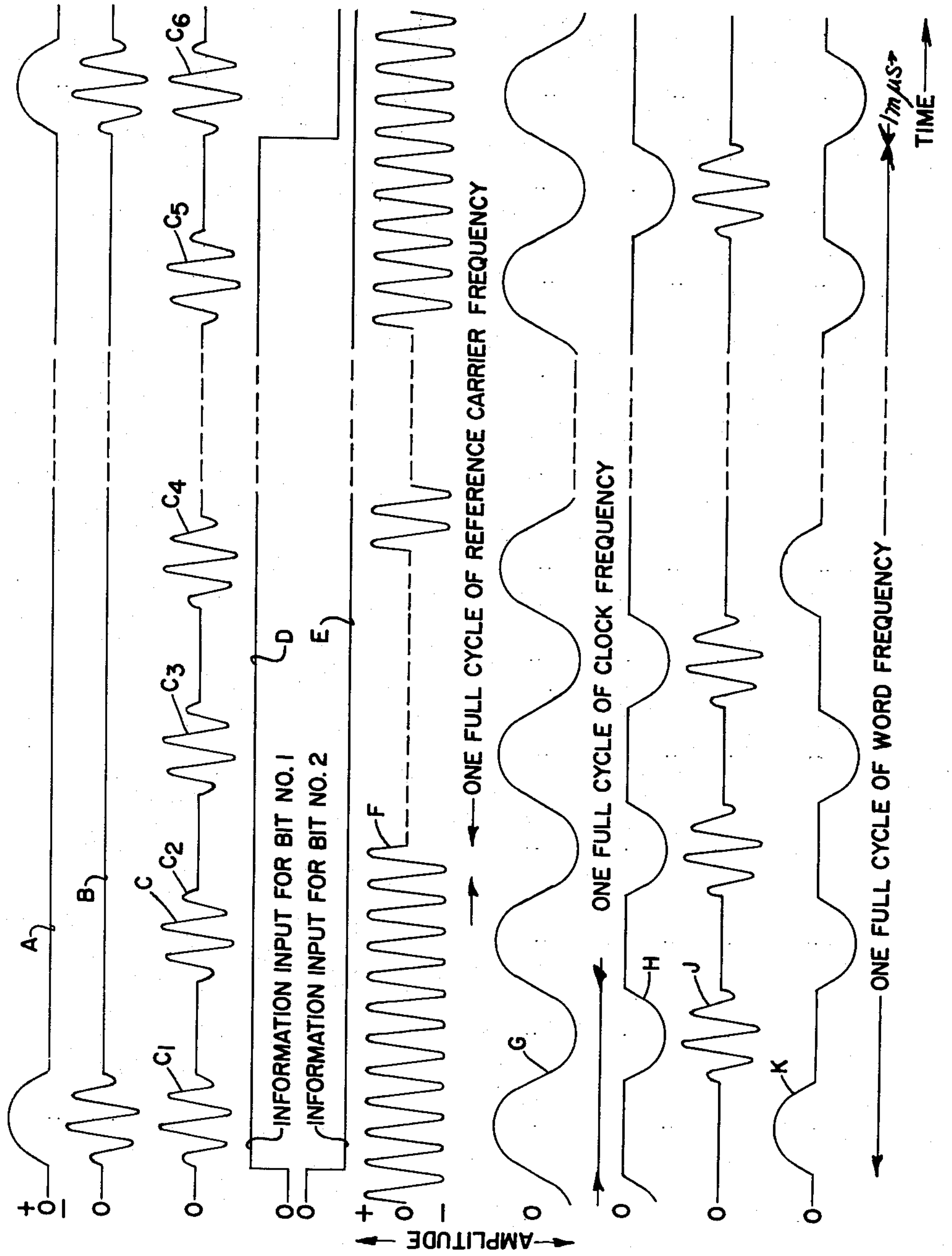
FIG. 6 is a set of graphs showing illustrative wave forms such as might be found at various points in a system like that of FIG. 3.

The E-arm of the magic-T 34 is connected to the carrier source, the wave form of which source is represented by curve F of FIG. 6.

Figure 9:
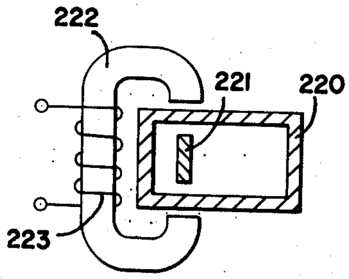
FIGS. 9, 10 and 11 are cross-sectional views of illustrative forms of waveguide devices comprising an isolator, a variable phase shifter, and a variable attenuator, respectively.

The H-arm of the magic-T 34 is connected through a waveguide-to-coaxial line adaptor 38 to a coaxial line 40 which is connected in turn through a coaxial line-to-waveguide adaptor 42 to a waveguide 44 which includes an adjustable attenuator 46 and a unidirectional transmission device or isolator 48. An isolator of a type suitable for use here and elsewhere in the system of FIG. 3 is shown in FIG. 9. The output wave from the magic-T 34 is a carrier wave which is amplitude modulated by the clock pulses from the clipper 24. Curve J of FIG. 6 represents this wave form. The isolator 48 is connected to the H-arm of a magic-T 50. The side arms of this magic-T are connected respectively to balanced waveguide segments 52 and 54 which include balanced diodes 56 and 58, respectively. Constant current biasing sources 60 and 62 are provided for the diodes 56 and 58, respectively.

The E-arm of the magic-T 50 is connected through a waveguide-to-coaxial adaptor 64 to a coaxial line 66, the E-arm, the adaptor and the coaxial line all being parts of the storage loop proper.

Figure 12:
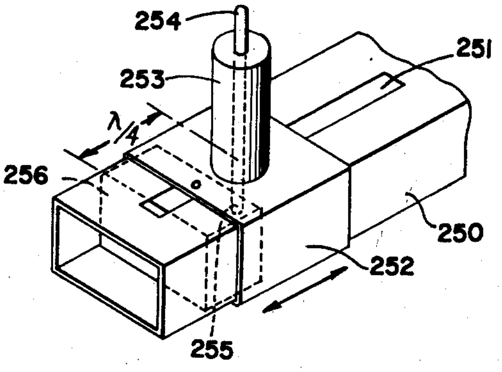
FIG. 12 is a perspective view of an adjustable adaptor for connecting together a coaxial line and a waveguide.

To provide for adjustment of the electrical length of the storage loop, a waveguide segment 68 is included in the loop. The segment 68 terminates in adaptors 70 and 72, one of which, for example 70, is slidably adjustable to vary the length of waveguide included in the storage loop. A slidably adjustable coaxial-to-waveguide adaptor of a type suitable for use here and elsewhere in the system of FIG. 3 is shown in FIG. 12.

Figure 8:
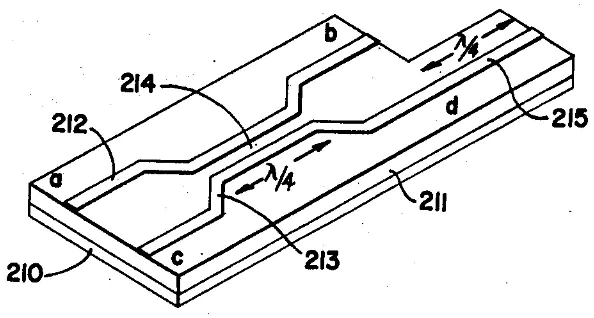

Continuing counterclockwise around the storage loop from the adaptor 72, the loop is mainly in coaxial line form and includes a first backward-type directional coupler 74, a traveling wave tube amplifier 76, and a second backward-type directional coupler 78. A backward-type directional coupler of a type suitable for use as coupler 74 and as coupler 78 is shown in FIG. 8. Beyond the coupler 78 there is provided additional coaxial line 80 according to the requirements of the total electrical length of the storage loop. The line 80 is connected through an adaptor 82 and a waveguide isolator 84 to the H-arm of a magic-T 86. In one satisfactory embodiment, the device 76 may be an X-band traveling wave tube amplifier of 5 milliwatts minimum power. Such traveling wave tube devices are commercially available, for example, from Hewlett-Packard Co., Palo Alto, California, under their designation, Model 494–A.

The side arms of the magic-T 86 comprise waveguide segments 88 and 90. The side arm 88 includes a diode 92 and an adjustable attenuator 94, while the side arm 90 includes a diode 96 and an adjustable attenuator 98.

Figure 10:
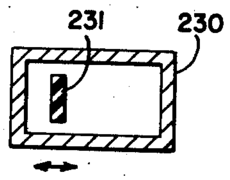

The 9.01 kmc. source is connected to the E-arm of the magic-T 86 through an adaptor 100, an isolator 102, a continuously adjustable phase shifter 104 and an adjustable attenuator 106. An adjustable phase shifter of a type suitable for use here and elsewhere in the system of FIG. 3 is shown in FIG. 10.

The diode 92 is connected to the diode 56 through a coaxial line type low pass filter 108 which is terminated in a low impedance resistor 110. This connection is shown in more detail in FIG. 5. The diode 96 is connected in similar manner to the diode 58 through a coaxial line type low pass filter 112 and terminating resistor 114.

Information may be read into the storage loop in the system of FIG. 3 through an input terminal 125 and a line length adjuster 146. Various read-in arrangements are known in the art wherein a plurality of bits of information that are stored in a register or other low speed information source may be converted into a train of pulses which may be fed at relatively high speed in serial fashion into a utilization device.

Figure 4:
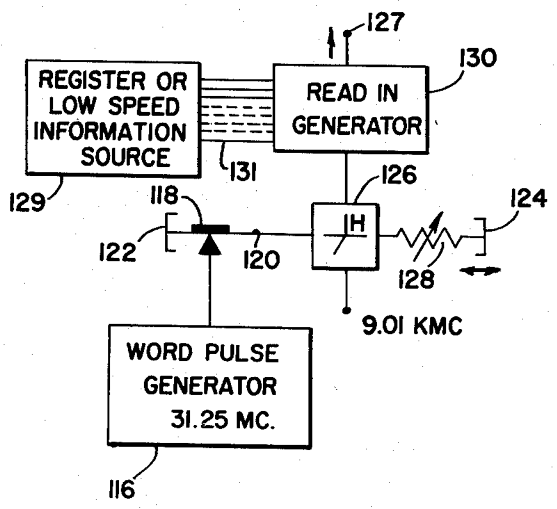
FIG. 4 is a block schematic diagram of a read-in system such as might be used with the embodiment shown in FIG. 3.

One possible form of such a read-in device is shown in FIG. 4. The device of FIG. 4 has an output terminal 127 which may be connected to the input terminal 125 of the system shown in FIG. 3. In the system of FIG. 4 there is provided a source 116 of word pulses of approximately one millimicrosecond duration, which source is connected to the diode 118. The word frequency in the system illustrated is 31.25 megacycles. The diode 118 is located in a waveguide segment 120 with a fixed short-circuit termination 122 at one end and a slidably adjustable short-circuit termination 124 at the other end. The segment 120 also includes the side arms of a magic-T 126 and an adjustable attenuator 128.

A connection is made to the E-arm of the magic-T 126 from the 9.01 kmc. source. The H-arm of the magic-T is connected to a read-in generator 130, which in turn is connected to an input terminal of the directional coupler 74 through a line length adjuster 146. A remaining terminal of the coupler 74 is connected to a resistance termination 132. An information register or other low speed information source 129 is connected to the read-in generator 130 through a plurality of parallel paths at 131, each individual to an information bit.

For the purpose of reading information out of the storage loop, a connection is made from the directional coupler 78 through an adjustable attenuator 134 to the E-arm of a magic-T 136. The 9.01 kmc. source is connected to the H-arm of the magic-T 136 through a slidably adjustable coaxial line-to-waveguide adaptor 138 and an attenuator 140. One side arm of the magic-T is connected to a sampling oscilloscope 142 while the remaining side arm is provided with a resistance termination 144.

In the operation of the system of FIG. 3, the carrier wave of reference phase is impressed continuously upon the E-arm of the magic-T 86 in the detector. In the absence of a pulse from the storage loop, the carrier wave applied to the matched diodes 92 and 96 produces substantially equal responses in these diodes. These responses are in the form of substantially unidirectional current pulses which are fed to the respective matched diodes 56 and 58 in the modulator, in each case through a low pass filter structure. In the absence of a pulse from the storage loop, the biasing effect of the detector current in each modulator diode is negligible compared to a biasing current from the respective constant current source 60 or 62. The constant current bias determines the normal operating point of each modulator diode. When a pulse train (substantially as in curve C, FIG. 6) from the storage loop is received at the detector, the carrier wave in a pulse in the train from the storage loop adds to the carrier wave in one of the detector diodes and subtracts from the carrier wave in the other detector diode. The resultant increased detector current from one detector diode increases the net bias on the associated modulator diode while the resultant decreased current from the other detector diode decreases the net bias on the modulator diode associated with this detector diode.

In the absence of a pulse from the storage loop, the modulator diodes 56, 58 are matched to each other in impedance. The current bias is adjusted so that the impedance of each diode is approximately matched to the characteristic impedance of the line. Amplitude-modulated carrier clock pulses are impressed upon the H-arm of the magic-T 50 of the detector. In the absence of a pulse from the storage loop, small residual reflections are produced in the modulator diodes 56 and 58. These reflections oppose each other in the E-arm of the magic-T 50 so that there is substantially no output from the E-arm. When a pulse is impressed upon the detector from the storage loop, the modulator becomes unbalanced. Then one modulator diode reverses the phase of a wave as it reflects the wave, while the other modulator diode reflects the wave without phase reversal. Since the H-arm of the magic-T 50 delivers carrier of the same phase to both diodes, the result of the phase reversal by reflection at one diode is to bring the two waves to the E-arm in unlike phase. The phase of the combined wave emerging from the E-arm is either the reference phase or it is 180 degrees different from the reference phase. Which of these two phases appears in any given case is determined by the phase of the pulse that is received from the storage loop.

It will be noted that when there is no carrier frequency input to the demodulator from the storage loop and at the same time no carrier frequency input to the re-modulator, a very large transmission loss for noise currents exists across the demodulator-re-modulator combination.

The low pass filter between the detector diode and the associated modulator diode is terminated at the end toward the modulator diode by a shunt resistance equal to the characteristic impedance of the low pass filter. The value of this shunt resistance is relatively very low compared to the series resistance in the constant current bias circuit. Slow changes of detector current pass through the low pass filter without appreciably changing the potential across the modulator diode. For very rapid changes in detector current, the modulator diode is effectively in shunt with the terminating resistance and there will be a material change in the potential across the modulator diode. Thus, upon receipt of a pulse from the loop, a rapid change in detector current will occur causing a material change in the diode potential, thereby causing an output pulse to be emitted from the modulator.

Figure 5:
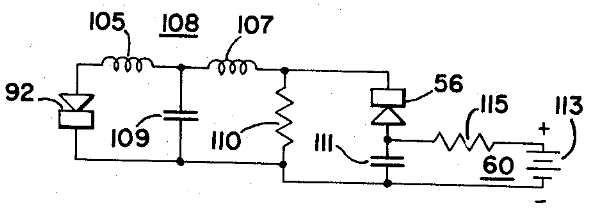
FIG. 5 is a schematic circuit diagram of a coupling arrangement between a demodulator diode and a re-modulator diode, with constant current biasing means connected to the re-modulator diode.

FIG. 5 shows in more detail an illustrative form of connection between one of the detector diodes, 92, and the associated modulator diode 56, together with an illustrative form of a biasing circuit for the diode 56. The low pass filter 108 is represented schematically by means of lumped elements, of which 105 and 107 denote series inductances and 109 denotes a shunt capacitance. It will be understood that the actual filter may be continuous in form, having no lumped elements, or it may comprise a combination of lumped elements and continuous reactances.

The filter 108 is terminated at the end remote from the diode 92 by the impedance matching resistor 110. The modulator diode 56 is connected in parallel with the resistor 110 in a path which includes a by-pass capacitor 111 in series with the diode 56. In the illustrative system of FIG. 3, the low pass filter 108 may pass waves having frequencies ranging from direct current up to approximately four kilomegacycles, for example, thereby suppressing the individual pulses occurring at the reference frequency rate of 9.01 kilomegacycles but freely transmitting the envelope form of bursts of pulses occurring at the clock frequency of 500 megacycles. The low pass filter may be of the stepped coaxial line type with a cut-off frequency of 4 kilomegacycles. Such filters are commercially available, for example, from Microlab, Livingston, N.J., under their designation, Model LB–4000.

The principal biasing source for the diode 56 is the constant current source represented schematically as a battery 113 connected in parallel with the by-pass capacitor 111 through a series resistor 115 or relatively large resistance.

In the operation of the system of FIG. 5, electromagnetic waves having the reference frequency of 9.01 kilomegacycles are impressed upon the detector diode 92 through the E-arm of the magic-T 86. Whenever a pulse is impressed upon the H-arm of the magic-T from the storage loop 20, additional electromagnetic waves having the frequency 9.01 kilomegacycles are superimposed upon the waves already present at the diode 92. In general, the two sets of waves will be either in phase or 180 degrees out of phase with each other, depending upon the phase of the waves comprising the pulse received from the storage loop 20. It will be noted that during intervals between the receipt of pulses from the storage loop, the diode 92 is subjected to waves of frequency 9.01 kilomegacycles and of substantially constant amplitude and phase. When a pulse is received from the storage loop, the waves impressed upon the diode 92, while remaining substantially constant in phase, within the time interval of a single pulse, change in amplitude, either increasing to substantially twice the normal amplitude or decreasing to nearly zero amplitude, depending upon the phase of the wave in the pulse received from the storage loop.

The waves of frequency 9.01 kilomegacycles are rectified by the diode 92 producing a train of unidirectional pulses which are impressed upon the low pass filter 108. As these changes may follow one another every two milli-micro-seconds, the group frequency of the rectified pulses is 500 megacycles. The cut-off frequency of the filter is too low to pass the individual half-cycles at the 9.01 kilomegacycle rate but it is high enough to pass the pulses as groups of amplitude modulated pulses modulated at the 500 megacycle rate.

The rectified 9.01 kilomegacycle reference wave will produce a steady current through the resistor 110 after passing through the low pass filter. Because of the high resistance 115 in series with the diode 56, the amount of rectified current through the diode 56 is negligible compared to the forward bias current supplied to diode 56 by the bias network. Since the resistance of resistor 110 is very small compared to the resistance at 115, the resistor 110 has a negligible effect upon the value of biasing current supplied to diode 56. Thus, the operating point of diode 56 is not sensitive to the amplitude of the 9.01 kilomegacycle reference wave at diode 92 nor is it sensitive to the polarity of diode 92 with respect to diode 56.

The diode 56 is decoupled from diode 92 for amplitude changes at diode 92 that are gradual, or slow compared to the clock frequency. Transient changes, however, pass freely through the by-pass condenser 111 and so cause a modulating potential across diode 56 of one polarity or the other depending upon whether the change is an increase or a decrease. A transient increase, as when a pulse adds to the reference wave at diode 92, causes an increase in the current through diode 56 and thereby a decrease in the effective resistance of diode 56. The diode 56 is thereby caused to approach the effect of a short-circuit termination of the waveguide segment 52 (FIG. 3). A transient decrease, as when a pulse subtracts from the reference wave at diode 92, causes a decrease in the current through diode 56 and thereby an increase in the effective resistance of diode 56. The diode 56 is thereby caused to approach the effect of an open-circuit termination of the wave-guide segment 52. The voltage changes across resistor 110 are illustrated by curve K in FIG. 6.

Thus, the modulator diode is unbalanced by transient changes at the detector diode but is insensitive to relatively slow changes at the detector diode. A portion of the total time delay of the storage loop occurs in the demodulator-filter-modulator link. In the illustrative embodiment previously cited, about two and one-half pulses are at all times passing through this link.

The carrier frequency amplitude in the clock pulses should be kept sufficiently small so that the relative effect of the clock pulse in determining the impedance of the modulator diode is kept small in comparison with the effect of the modulating pulse from the detector diode. In this way, the impedance of the modulator diodes may be made substantially independent of variations in the amplitude of the clock pulses. The action of the modulator then may be regarded as purely that of a variable reflector for the clock pulses and it should not serve significantly as a rectifier of the clock pulses. This latter function would result in error due to a variation in the reflective properties of the modulator under the control of the clock pulses themselves. It is desired, of course, that the reflective properties of the modulator be under the sole control of the modulating pulses coming to the modulator from the detector.

It is further desirable in a binary system that reflections in the modulator shall occur in two phases only, namely, in reference phase or exactly 180 degrees out of phase with reference phase. For this reason it is desirable that the modulator diodes be purely resistive. Any reactive component of impedance in the diode will produce reflections that are not collinear with the reference phase. Since in order to provide a variable impedance, the diode must be non-linear in its current-versus-voltage relationship, the modulator diode should be a non-linear resistance, approaching as nearly as may be an ideal non-linear resistance. The two modulator diodes operate in push-pull relationship to each other and preferably should have balanced modulation characteristics. It will be evident that if the modulator diodes are balanced and purely resistive, it will be possible to obtain reflections that are precisely 180 degrees apart and which when combined in additive relationship produce signals of maximum amplitude in the output arm of the modulator. The phase of the reflection will be substantially independent of the amplitude of the modulating signal impressed upon the modulator diode. A single non-linear resistance element suffices for a balanced phase modulator although two such elements may be used when desired. The balance of a pair of diodes may be improved by selection of diodes of nearly identical electrical properties and especially of low reactance.

A diode which has been found to be suitable for use as the modulator diodes 56 and 58 is a germanium point contact diode known in the art as the 1N263. The diodes 26 and 118 may also be 1N263's. For the detector diodes 92 and 96, a silicon point contact diode known as the 1N415B has been found to be suitable.

The usable loop length may be increased by employing substantially non-dispersive transmission systems, for example, types which operate with waves of the TEM mode, such as systems comprising coaxial cable, strip line, microstrip or the like. Waveguide, on the other hand, is dispersive and its use should be minimized.

Where it is nevertheless desirable to make use of certain waveguide properties, as for example for phase shifting and for adjusting the equivalent electrical length of line, and also in hybrid junctions, directional couplers, etc., waveguide-to-coaxial adaptors and coaxial-to-waveguide adaptors are provided.

Information to be read in to the loop 20 may originate, for example, in a register comprising a plurality of two-state devices such as flip-flops, which are relatively low speed devices capable of changing state at a relatively low repetition rate compared to the loop 20. Any low speed source may be used which can change state at the word frequency, for example, 31.25 megacycles in the embodiment illustrated. On the other hand, the information to be read in may come from some high speed source that is capable of supplying phase-modulated pulses at the clock frequency used in the loop 20 provided the carrier frequency is the same as in the loop and provided the phase modulation is such that the phases in the pulses read in are collinear with the phases in the pulses in the loop.

When a low speed information source is used for reading in, as in the illustrative arrangement of FIG. 4, word pulses from the generator 116 (curve A, FIG. 6) periodically change the impedance of the diode 118, thereby unbalancing the magic-T 126 and permitting pulses of carrier frequency waves (curve B, FIG. 6) to pass through the magic-T into the read-in generator 130 at the word frequency rate. During each word cycle, a plurality of signal pulses are applied to the read-in generator over individual paths at 131, each pulse representing one bit of information. Two such pulses, as for bit No. 1 and bit No. 2, are illustrated in curves D and E, respectively, in FIG. 6. The function of the read-in generator is to send out a serial group of pulses at clock frequency in which each individual pulse is phase modulated in accordance with a different bit of information in a definite order, as illustrated in curve C, FIG. 6, the entire group being sent out during a single cycle of the word frequency. In the example shown in FIG. 6, the pulses labeled $C_1$ and $C_4$ are shown as being of reference phase, representing digits "zero," while the pulses labeled $C_2$, $C_3$, $C_5$ and $C_6$ are shown as being 180 degrees different from reference phase, representing digits "one." The specific construction and mode of operation of the read-in generator is not material to the present invention, and, as such devices are known in the art, no detailed description of the read-in generator will be given.

It will be assumed that the pulses circulating around the loop 20 at any given time are phase modulated collinearly with the reference phase. Then, at read in, each pulse as it is impressed upon the loop should also be phase modulated collinearly with the reference phase. The amplitude of a pulse being read in to the loop should be approximately twice the amplitude of the pulses existing in the loop in order that in case the phases in the read-in pulse and in the circulating pulse are opposed, the read-in pulse will over-ride the circulating pulse, combining with it to form a pulse of the opposite phase and of approximately the original amplitude. The newly-formed pulse will then propagate around the loop in place of the original pulse.

Information may be read out of the loop 20 for use in other high speed information-handling apparatus by taking off energy through the directional coupler 78 at an output terminal 133. If it is desired to transfer the information to a register or some form of low speed storage device, the magic-T 136 may be used. The phase-modulated pulses are applied to the E-arm of the magic-T through the variable attenuator 134. A carrier wave of reference phase is applied to the H-arm of the magic-T through the line length adjuster 138 and the attenuator 140. One side arm of the magic-T is connected to a sampling oscilloscope 142. When the phase of a pulse agrees with the reference phase the combination of the waves in the magic-T produces a wave of substantially twice normal amplitude, while when the phases are different a wave of very low amplitude results. In a high speed oscilloscope, such waves of different amplitude may be distinguished upon the screen of the oscilloscope. Other known means of translating the information in the high speed pulses for use in lower speed devices are known and may be used in place of the arrangement shown in FIG. 3.

The initial phase adjustment of the system of FIG. 3 may be made in the following manner. The master reference phase is that of the carrier wave impressed upon the E-arm of magic-T 86. With the read-in generator shut down (no input at terminal 125) and with the reference wave on the H-arm of magic-T 136 fully attenuated by attenuator 140 the line length adjusted 70 is varied to maximize the signal from the loop on the sampling oscilloscope display at 142. This adjustment establishes a collinear phase relationship between the reference phase and the loop signal's phase at the demodulator, and also the condition of circulating zeros in the loop. The circulating zeros can now be phase detected by varying attenuator 140 and line length adjuster 138 to obtain a display of fixed polarity on the sampling oscilloscope. A display of the opposite polarity will then indicate the condition of circulating ones.

The next step is to adjust the phase of signals that are to be read into the storage loop by way of the read-in terminal 125. With the loop 20 shut down by attenuating the input clock pulses by means of the attenuator 46, an input train of pulses representing all zeros is impressed upon the terminal 125 from any suitable source. In case the read-in arrangement of FIG. 4 is used, a train of pulses representing all zeros may be obtained by setting up the register 129 to indicate all zeros. The carrier phase of the pulse train is then adjusted to obtain the same display on the sampling oscilloscope as appeared under the previous condition of circulating zeros in the loop. In the system of FIG. 4, the carrier phase of the pulse train may be adjusted by varying the line length adjuster 146.

It will be noted that if the delay time around the loop including the regenerative repeater at any time varies as much as one quarter of a carrier cycle from the correct value, the system may become unstable, passing into a state wherein the repeater will introduce an undesired phase reversal, or the read-out device will read incorrectly, or both. Therefore, carrier phase stability is a prime requirement of the system.

It will be noted, however, that an absolute phase lock at the carrier frequency is not required. Reference phase, or the opposite, is always being put out by the remodulator. It is sufficient that the pulses received at the demodulator be approximately in reference phase, or the opposite, within a small fraction of a carrier cycle, for the re-modulator will then make the necessary phase correction, putting out at the proper instant, not an exact replica of the pulse received by the demodulator, but a pulse of reference phase, or the opposite, so that the phase conditions at the read-in and read-out stations, once properly adjusted will remain correct.

On account of the unavoidable dispersion in the loop, the detector output pulse will generally be of somewhat greater duration than a clock pulse, so that even though the loop delay differs slightly from an integral number of clock pulse periods, the detector output pulse, if it occurs at approximately the proper time, will completely overlap a clock pulse. Accordingly, the modulator will operate during substantially the entire duration of the clock pulse. In this way, retiming of the circulating pulse is effected in addition to rephasing.

Figure 7:
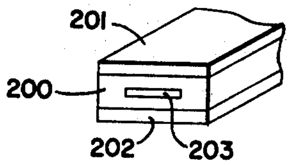
FIGS. 7 and 8 are perspective views of strip line transmission devices suitable for use in the systems illustrated.

FIG. 7 is a perspective view of a piece of stripline, which, like coaxial cable, is substantially non-dispersive, and is for that reason suitable for use in the storage loop 20. This line comprises a strip 200 of dielectric material bonded at top and bottom to metallic plates 201 and 202 respectively. A center conductive strip 203 is provided which may be embedded in the dielectric strip 200.

The stripline of FIG. 7 may be comprised of separate top and bottom assemblies of the general type shown in FIG. 8. In this figure a base plate 210 of metal is provided to which is bonded a coating 211 of insulative material. On the upper face of the material 211 there are secured one or more metallic strips such as 212 and 213. Top and bottom assemblies such as the one shown in FIG. 8 may be made as mirror images of each other with respect to the arrangement of the metallic strips. The two assemblies may be clamped together with the metallic strips in contact with one another to form an assembly of the general kind shown in FIG. 7. FIG. 8 shows a specific arrangement of metallic strips to form a backward type directional coupler for use as indicated by the couplers 74 and 78 in FIG. 3. The strip 212 has its ends indicated at *a* and *b* respectively. The ends of strip 213 are similarly indicated by *c* and *d* respectively. The strips 212 and 213 are brought into close proximity at 214 so that waves in one strip induce waves in the other. A wave impressed at *a* has a portion of its energy transmitted by induction into the strip 213 and a part of this energy appears at *c*.

For low coupling, arm *d* is substantially isolated from an input into arm *a* when the length of the coupling region is equal to $\lambda/4$ at the frequency of transmission and each arm is terminated in the characteristic impedance of the line. The device of FIG. 8 may be made to operate as a sum and difference network which is equivalent to the application of magic-T's 50 and 86 in the storage loop. For this purpose, a coupling of 3 db is used and a 90° phase shifting network which may be in the form of a quarter wavelength line segment 215 is connected to the arm *d* where *a* and *d* are the input arms of the sum and difference network.

FIG. 9 shows a waveguide embodiment of an isolator, suitable to be used for isolators 48, 84 and 102 in FIG. 3. A rectangular waveguide is shown in cross section having a metallic wall 220. Inside the waveguide there is mounted a strip 221 of magnetic material, for example, ferrite. The strip 221 may be subjected to a steady magnetic field by means of a magnetic core 222 and a winding 223. When the strip 221 is magnetized the electric field pattern inside the waveguide is distorted in such a way that waves may be transmitted freely in one direction through the waveguide but waves traveling in the reverse direction are attenuated.

FIG. 10 shows a waveguide form of a variable phase shifter, suitable to be used as phase shifter 104 in FIG. 3. The metallic sheath of the waveguide is shown at 230. Inside the waveguide is mounted a dielectric strip 231 which is movable in a transverse direction across the waveguide. The presence of the dielectric strip in the waveguide serves to change the speed of propagation of waves and therefore controls the phase shift. By varying the position of the strip 231 the dielectric material may be placed in a weaker field or in a strong field and in this way the amount of phase shift may be varied.

FIG. 11 is similar to FIG. 10 except that a strip 240 mounted inside the waveguide comprises resistive material. For example the strip 240 may be carbonized cardboard or the like. In all the devices FIGS. 9–11, the electromagnetic field inside the waveguide varies in the transverse direction across the waveguide. By moving the strip 240 the resistive material may be placed in a weak field or in a strong field and in this way the amount of energy absorbed by the strip may be varied. The device of FIG. 11 therefore functions as a variable attenuator, suitable to use for the variable attenuators 36, 46, 94, 98, 106, 128, 134 and 140 in FIG. 3.

FIG. 12 shows an adaptor for use between a coaxial line and a waveguide. The waveguide shown at 250 is provided with a slot 251. A slider 252 upon which is mounted a coaxial cable with outer conductor 253 and inner conductor 254 is arranged to slide lengthwise of the waveguide to vary the position of the coupling between the waveguide and the coaxial line. The inner conductor 254 extends through the slot 251 into the interior of the waveguide to form a probe 255. A shorting block 256 is attached to the slider 252 and spaced approximately a quarter wavelength behind the probe. The adaptor of FIG. 12 is of a type suitable to use at one end of either the line length adjustors 70, 138 and 146 of FIG. 3. Without the adjustable feature, the adaptor of FIG. 12 becomes suitable to use for the fixed adaptors 38, 42, 64, 72, 82 and 100 of FIG. 3. In the non-adjustable form the probe 255 is fixedly mounted approximately one-quarter wavelength from the shorting block 256.

Figure 13:
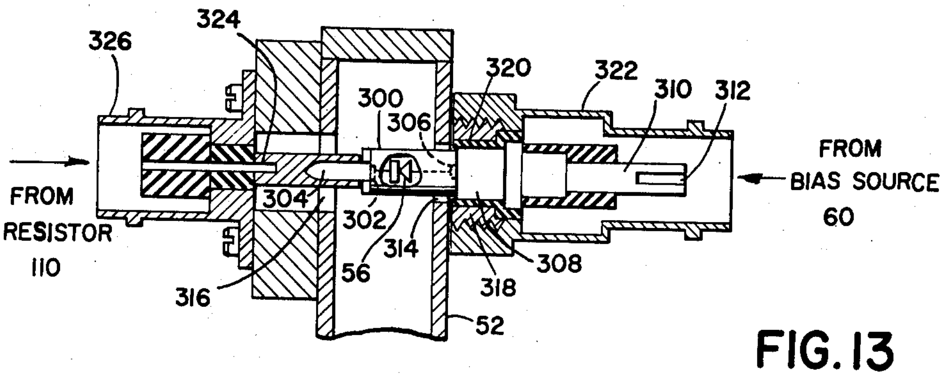
FIG. 13 is a cross-sectional view, partly diagrammatical and partly broken away, showing a diode mounting for use in a system of the type shown in FIG. 5.

FIG. 13 shows a diode mounting through which a constant current bias may be applied to a modulator diode. The mounting is shown in cross section except that the diode is indicated symbolically at 56. The mounting is shown attached to the waveguide 52. The diode 56 is contained within a wave-permeable encased preferably hollow cylindrical member 300. According to the desired polarity of the diode in any given application, one terminal of the diode is conductively connected at 302 to a conductive prong 304 attached to one end of the member 300. The other terminal of the diode is conductively connected at 306 to a conductive, preferably solid cylindrical member 308. Attached to the member 308 are one or more conductive members of which the outer member 310 is provided with a socket 312 to accommodate a central prong of a male coaxial connector. The diode assembly is inserted through aligned holes 314 and 316 in the walls of the waveguide 52 and through a central hole in a male threaded member 318 attached to the waveguide wall. An insulating bushing 320 is fitted between the member 318 and the cylinder 308 to form with these members the by-pass capacitor 111 shown in FIG. 5. A hollow cylindrical member 322 is provided which is internally threaded to engage the member 318 and forms the outer conductor for engaging the coaxial connector which leads to the bias source 60. The prong 304 engages a socket in a member 324, which member may be inserted through the hole 316. The member 324 and a hollow cylindrical member 326 together form terminals to which may be connected a coaxial connector leading to the resistor 110 of FIG. 5.

Figure 14:
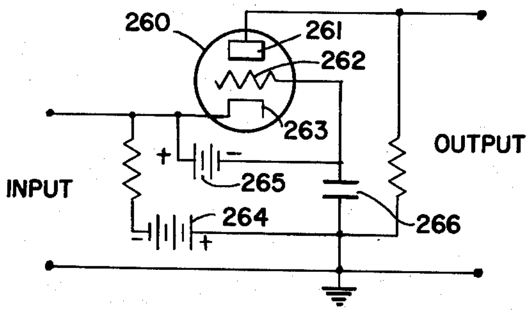
FIG. 14 is a schematic diagram of a clipper circuit.

FIG. 14 shows a clipper circuit such as may be used in the clipper 24 of FIG. 3. The circuit comprises a triode 260 having an anode 261, a control grid 262 and a cathode 263. The triode may, for example, be a 416B vacuum tube, in a grounded grid connection as shown, and supplied by a 150 volt source 264. The grid is biased to cut-off or somewhat beyond, by means of a biasing source 265, while a capacitor 266 is provided between the grid and ground to maintain the grounded-grid condition for alternating currents. A wave applied to the input between ground and the cathode is effective to produce output pulses only during the portion of the cycle when the input overcomes the bias, the output appearing in the form of negative pulses between the anode and ground.

While illustrative forms of apparatus in accordance with the invention have been described and shown herein, it will be understood that numerous changes may be made without departing from the general principles and scope of the invention.

What is claimed is:

1. In memory apparatus, a non-oscillatory regenerative loop capable of sustaining phase-modulated electromagnetic carrier waves in at least two stable phase conditions, said loop including: a source of phase modulated carrier waves, a balanced demodulator, a remodulator, means for guiding said waves along a path, means connecting said wave guiding means, said demodulator and said remodulator together, in that order, in series loop relation, means applying to said demodulator a reference electromagnetic wave having the frequency of said waves traveling along said path, and input means connected to said loop at a read-in station and synchronized with the said source of carrier waves for coupling into said loop an information-bearing phase modulated input wave, said input wave being phase modulated so that at any given moment when it is applied to said loop, it is substantially in phase with or 180° out of phase with respect to the waves then existing in said loop at said read-in station, said input wave acting to control the phase modulation of the waves in said loop, thereby storing in said loop a plurality of bits of information as represented by the phase of successive trains of waves traveling along said path in said loop.

2. Apparatus according to claim 1, including means for adjusting the length of said loop.

3. Apparatus according to claim 1, in which the length of said path is at least one order of magnitude greater than the wavelength of said electromagnetic carrier waves.

4. Apparatus according to claim 1, in which the phase of said reference electromagnetic wave is a reference phase for information stored in said loop.

5. In apparatus for storing simultaneously a plurality of bits of information, in combination, means forming a regenerative loop, means for establishing in said loop a wave of carrier frequency traveling along a path, means for phase modulating said wave so that it has phase conditions representing a plurality of bits of information, detecting means in said loop for said phase modulated waves, remodulating means for regenerating said phase modulated waves at the original carrier frequency, a carrier source synchronized with said wave establishing means connected to said remodulating means for causing said phase modulated traveling carrier wave to be stable in its said phase conditions, the electrical length of said loop being great enough that the transit time around said loop is at least several times greater than the modulation repetition period of said phase modulation, whereby there may be maintained in said loop a circulating wave, phase-modulated so as to represent a plurality of bits of information.

6. In memory apparatus, a loop including: means having opposed, spaced apart, metallic surfaces for guiding microwaves so that they travel along an elongated path, an amplifier, wave detecting means responsive to the phase of a wave impressed thereon to produce a substantially unidirectional detected signal the polarity of which is representative of the said phase, phase modulating means responsive to said detected signals to produce an output wave of the same frequency as the said impressed wave and having one of two stable phase conditions depending upon the polarity of said detected signal; input means connected to said loop at a station for coupling into said loop an information-bearing wave of overriding amplitude with respect to the amplitude of the wave in said loop at said station, said input wave being phase modulated so that, at any given moment when it is applied to said loop, it is substantially in phase with or 180° out of phase with respect to the waves then existing in said loop at said station, whereby said input wave is capable of switching the wave in said loop from one of said two stable phases to the other of said two stable phases, and output means coupled to said loop.

7. In memory apparatus, a loop including: means having opposed, spaced apart, metallic surfaces for guiding microwaves so that they travel along an elongated path, an amplifier, phase detecting means, phase modulating means operating at the same carrier frequency as said phase detecting means, low pass filter means connecting the output of the phase detecting means to the input of the phase modulating means; read-in means connected to said loop at a station for coupling into said loop an information-bearing phase-modulated wave of overriding amplitude with respect to the output wave from said phase modulating means, said information-bearing wave being of such phase that, when it is applied to said loop, it is substantially in phase with or 180° out of phase with respect to the waves then existing in said loop at said station, whereby said information-bearing wave is capable of switching the wave in said loop, and read-out means coupled to said loop from one of said two phases to the other of said two phases.

8. In memory apparatus, a loop including: means having opposed, spaced apart, metallic surfaces for guiding microwaves so that they travel along an elongated path, means to generate a train of phase-modulated pulses of given carrier frequency, unidirectional transmission means to restrict said train of pulses to one-way transmission in said loop, an amplifier, a phase-demodulator responsive to said train of pulses to produce a train of unidirectional current pulses of varying polarity dependent upon the phase of the successive pulses in said train, a phase modulator responsive to said train of unidirectional pulses to produce a new train of phase-modulated pulses of said given carrier frequency and of one or the other of two stable phase values dependent upon the polarity of the successive unidirectional pulses, and low pass filter means connecting the output of the phase demodulator to the input of the phase modulator, whereby direct transmission of the said first-mentioned train of phase-modulated pulses is blocked over a portion of said loop while phase information is transmitted over the entire length of the loop.

9. In memory apparatus, a source of microwaves, a phase modulator, waveguiding means connected to the output of the phase modulator, said waveguiding means comprising opposed, spaced apart, metallic surfaced members forming an elongated path for said microwaves, said path introducing a certain delay time into transmission of said waves thereover, a phase demodulator connected to the output of said waveguiding means, said phase demodulator being responsive to phase-modulated waves of a given carrier frequency and of either of two stable phases to produce relatively low frequency signals representative of the particular phase of said phase-modulated waves, a low pass filter capable of passing said signals, said filter being connected between the output of the phase demodulator and the input of the phase modulator, whereby direct transmission of said phase-modulated waves is blocked by the said filter while phase information is transmitted around a complete loop comprising said modulator, said waveguiding means, said demodulator and said filter with an over-all delay time, a source of regularly recurring pulses of phase-modulated carrier waves of given pulse period and having the same carrier frequency to which said phase demodulator is responsive, means to impress said pulses upon said loop in the form of a train, and means to adjust the over-all delay time of the loop to equal an integral multiple of half cycles of said microwaves, whereby the number and spacing of the pulses is preserved during repeated trips of the said pulse train around the said loop.

10. In memory apparatus, a source of carrier frequency pulses, amplitude-modulated at a controlled clock frequency, and comprising carrier waves of a given carrier frequency and of a reference phase, phase reversing means connected to said pulse source, wave-guiding means connected to the output of said phase reversing means, said waveguiding means comprising opposed, spaced apart, metallic surfaces forming an elongated path for waves at the carrier frequency of said pulses, said path introducing a certain delay time for transmission of said waves thereover, a phase demodulator connected to the output of said waveguiding means, said phase demodulator being responsive to phase modulated waves of said given carrier frequency and of either of two opposing phases to produce relatively low frequency signals representative of the particular phase of said phase-modulated waves, low pass filter means capable of passing said signals and rejecting waves of carrier frequency, said filter means being connected between the output of the said phase demodulator and the input of the said phase reversing means, to pass said signals to said phase reversing means to control the same, whereby direct transmission of said phase-modulated waves is blocked by said filter means while information relating to the particular phase value of said phase-modulated waves is transmitted to said phase reversing means and thence around a complete loop comprising said phase reversing means, said waveguiding means, said demodulator and said filter means with a certain over-all delay time, a source of information-bearing carrier frequency pulses, means to impress a train of said last-mentioned pulses upon said loop, said train having a time of duration approximately equal to an integral number of cycles of the clock frequency and at least approximately equal to said over-all delay time for the said loop, and means to adjust the said over-all delay time to make the same equal to an integral number of half cycles of the carrier frequency, whereby said information-bearing pulse train is rendered collinear with said reference phase.

11. In a regenerative repeater, in combination, a detector diode, low pass filter means connected to said detector diode, a resistor terminating said filter means at the end thereof remote from said detector diode, means connected in parallel with said resistor comprising a serial combination of a modulator diode and a by-pass capacitor, and constant current biasing means for said modulator diode connected in parallel with said capacitor for applying a forward bias to said modulator diode, said resistor being of relatively small resistance value compared to the resistance value of said constant current biasing means.

12. In an information storage system employing a phase notation, in combination, an electromagnetic delay loop comprising a carrier frequency portion adapted to sustain traveling waves of carrier frequency amplitude-modulated into pulses at a lower, clock frequency rate, read-in means for phase-modulating the carrier frequency of successive said pulses to represent items of information in phase notation, said loop also comprising a clock frequency portion connected to the output of the said carrier frequency portion, means included in said clock frequency portion to phase demodulate a train of said carrier pulses into a train of clock frequency pulses, the polarity of successive clock frequency pulses varying to represent the carrier phase of said successive phase-modulated carrier pulses, filter means included in said clock frequency portion and connected to the output of said phase demodulator means to pass pulses of clock frequency while substantially eliminating carrier frequency variations within said clock frequency pulses, each said clock frequency pulse serving to transmit through said filter the phase information of a respective phase-modulated carrier pulse while substantially suppressing waves of the carrier frequency, a source of timing waves of said clock frequency, a source of carrier frequency waves amplitude-modulated into pulses at the clock frequency rate and synchronized with said source of clock frequency timing waves, means controlled by said clock frequency pulses from said phase demodulator for phase-modulating said last-mentioned carrier frequency waves in accordance with the phase information content of said clock frequency pulses, and means for impressing said last-mentioned carrier frequency waves upon the input of the said carrier frequency portion of the delay loop.

13. Apparatus according to claim 12, together with read-out means coupled to the carrier frequency portion of the delay loop for phase demodulating pulses circulating in said loop.

14. Apparatus according to claim 12, together with constant current biasing means connected to said phase modulating means.

15. Apparatus according to claim 12, in which said phase demodulating means and said phase modulating means are each comprised within a sum and difference network.

16. Apparatus according to claim 12, together with a by-pass capacitor connected to said phase modulating means for transmitting clock frequency pulses to said phase modulating means, and means connected to said phase modulating means for attenuating voltage variations occurring at a rate materially lower than the clock frequency for substantially preventing said slower variations from adversely affecting the normal operating conditions of said phase modulating means.

17. In a regenerative system for pulses of phase modulated carrier waves, in combination, a source of carrier waves of given carrier frequency and reference phase, a delay line having input and output ends, means located at the output end of the delay line for detecting the phase of the carrier waves of any received pulse as to whether the carrier phase is in a phase range nearer the said reference phase or in a phase range nearer to 180 degrees different from said reference phase, means actuated by said phase detecting means for producing control pulses distinguishable as representing a detected phase lying in one or the other of said two phase ranges, a source of waves of a given clock frequency, means actuated by said source of clock frequency waves for forming waves from said carrier wave source into pulses of carrier waves repeated at the said clock frequency, and phase modulating means controlled by said control pulses for applying said carrier wave pulses to the input end of the delay line either in reference phase or in the phase opposite thereto, to correct for phase deviation of the carrier waves in the phase modulated carrier wave pulses detected at the input end of the delay line.

18. In memory apparatus, a non-oscillatory regenerative loop capable of sustaining phase-modulated electromagnetic carrier waves in at least two stable phase conditions, said loop including: a first source of phase-modulated carrier waves, means for guiding waves from said source along a path, amplifying means, input means comprising a second source of phase-modulated carrier waves connected to said loop at a read-in station and having a definite carrier frequency phase relationship with said first source for coupling into said loop an information-bearing phase-modulated input wave, said input wave being modulated in such phase that at any given moment when it is applied to said loop, it is substantially in phase with or 180° out of phase with respect to the waves then existing in said loop at said read-in station, said input wave acting to control the phase-modulation of the waves in said loop, thereby storing in said loop a plurality of bits of information as represented by the phase of successive trains of waves traveling along said path in said loop, and pulse expanding means comprising a diode having a variable conductance the value of which increases with increasing amplitude of pulses impressed thereon up to a saturation value.

19. In memory apparatus, a non-oscillatory regenerative loop capable of sustaining phase-modulated electromagnetic carrier waves in at least two stable phase conditions, said loop including: a first source of phase-modulated carrier waves, means for guiding waves from said source along a path, amplifying means, input means comprising a second source of phase-modulated carrier waves connected to said loop at a read-in station and having a definite carrier frequency phase relationship with said first source for coupling into said loop an information-bearing phase-modulated input wave, said input wave being modulated in such phase that at any given moment when it is applied to said loop, it is substantially in phase with or 180° out of phase with respect to the waves then existing in said loop at said read-in station, said input wave acting to control the phase-modulation of the waves in said loop, thereby storing in said loop a plurality of bits of information as represented by the phase of successive trains of waves traveling along said path in said loop, and demodulating and remodulating means, comprising a first and a second waveguide junction, each having an E-arm, an H-arm and two side arms, diode means connected in each of the side arms of said waveguide junctions, means coupling the diodes in the side arms of the first of said waveguide junctions to the diodes in the side arms of the second, means connecting one end of said waveguide means to one of the other arms of said first waveguide junction, means for impressing a reference wave upon the remaining arm of said first junction, and means connected to the E-arm and H-arm of the other of said waveguide junctions for applying to one of them a clock signal and for deriving from the other of them waves for application to the other end of said waveguiding means.

20. In combination, a source of phase-modulated carrier pulses of reference carrier frequency, carrier phase and pulse timing, a delay line, variable coupling means connecting the output of said source to the input of said delay line, said variable coupling means comprising means operative in the absence of a modulating signal to substantially prevent transmission of pulses from said source to said delay line and phase modulating means operative in response to a modulating signal for selectively transmitting pulses from said source to said delay line in either of two carrier phases each in a distinctive relationship to said reference carrier phase, phase demodulating means having its input connected to the output of said delay line, connecting means interconnecting the output of said phase demoduating means and the input of said phase modulating means to provide a modulating signal for said variable coupling means, said signal comprising a substantially unidirectional signal the amplitude of which is determined by the amplitude of said phase-modulated carrier pulses, amplitude expanding means inserted between said delay line and said modulating means, and means for impressing said unidirectional signal upon said amplitude expanding means for the purpose of relatively attenuating signals of less than a certain minimum amplitude, whereby extraneous pulses tend to be eliminated, said connecting means including transmission means insensitive to ampliudes changes in the detected signal which occur more slowly than the pulse repetition rate and responsive to transient changes such as occur within the duration of a pulse.

21. Apparatus according to claim 20, in which means are inserted between said delay line and said modulating means for substantially suppressing transmission of pulses of said carrier frequency from said delay line to said modulating means while transmitting said unidirectional signals freely between said phase demodulating means and said phase modulating means.

22. Apparatus according to claim 21, in which said transmission suppressing means comprises filter means for substantially preventing transmission of waves of said carrier frequency from said delay line to said modulating means.

References Cited in the file of this patent

UNITED STATES PATENTS

| | | |
|---|---|---|
| 2,914,249 | Goodall | Nov. 14, 1959 |
| 2,933,717 | Tyas | Apr. 19, 1960 |